United States Patent
Jordan et al.

(10) Patent No.: US 8,510,146 B2
(45) Date of Patent: Aug. 13, 2013

(54) CONTACT CENTER SIZING AND BROADCASTING BASED ON PROBABILITIES

(75) Inventors: Kenneth Jordan, Groton, MA (US); Khaled A. Gouda, Shrewsbury, MA (US); Soufiane Houri, Boston, MA (US)

(73) Assignee: Cisco Technology, Inc., San Jose, CA (US)

( * ) Notice: Subject to any disclaimer, the term of this patent is extended or adjusted under 35 U.S.C. 154(b) by 369 days.

(21) Appl. No.: 12/204,342

(22) Filed: Sep. 4, 2008

(65) Prior Publication Data
US 2010/0057521 A1 Mar. 4, 2010

(51) Int. Cl.
*G06Q 10/00* (2006.01)
*G06Q 10/06* (2012.01)

(52) U.S. Cl.
CPC .............. *G06Q 10/06* (2013.01); *G06Q 10/063* (2013.01); *G06Q 10/0639* (2013.01); *G06Q 10/067* (2013.01)
USPC ......... 705/7.14; 705/1.1; 705/7.12; 705/7.13; 705/7.22

(58) Field of Classification Search
None
See application file for complete search history.

(56) References Cited

U.S. PATENT DOCUMENTS

| 5,237,571 A | 8/1993 | Cotton et al. |
| 5,859,899 A * | 1/1999 | Sakai et al. ................. 379/92.01 |
| 6,047,052 A | 4/2000 | Sakai et al. |
| 6,418,136 B1 * | 7/2002 | Naor et al. .................... 370/347 |
| 6,542,514 B1 * | 4/2003 | Yamada ......................... 370/432 |
| 6,578,005 B1 * | 6/2003 | Lesaint et al. .................... 705/8 |
| 6,744,858 B1 * | 6/2004 | Ryan et al. ...................... 379/45 |
| 7,130,809 B1 * | 10/2006 | Fors ................................. 705/10 |
| 7,516,455 B2 * | 4/2009 | Matheson et al. ............ 718/102 |
| 7,660,406 B2 * | 2/2010 | Fama et al. .............. 379/265.05 |
| 7,715,546 B2 * | 5/2010 | Pagel et al. .............. 379/265.02 |
| 2008/0095355 A1 * | 4/2008 | Mahalaha et al. ....... 379/265.09 |
| 2008/0205428 A1 * | 8/2008 | Jordan et al. .................. 370/438 |

* cited by examiner

*Primary Examiner* — Fateh Obaid
(74) *Attorney, Agent, or Firm* — Brinks Hofer Gilson & Lione

(57) ABSTRACT

A contact center or enterprise communication system is provided. The system includes a first contact associated with a first task offer; one or more resources operable to accept the first task offer; and a contact center or enterprise communication system operable to determine a broadcast group of the one or more resources as a function of an acceptance factor for one or more of the resources.

20 Claims, 7 Drawing Sheets

| Resources 40 | Acceptance Factor |
|---|---|
| Resource (A1) | .1 |
| Resource (A2) | .2 |
| Resource (A3) | .3 |
| Resource (A4) | .4 |
| Resource (A5) | .5 |
| Resource (A6) | .6 |

FIGURE 4

CONTACT CENTER SIZING AND BROADCASTING BASED ON PROBABILITIES

BACKGROUND

I. Field of Technology

The present embodiments relate to sizing contact center resources and/or the number of broadcast messages.

II. Background of Technology

A contact center provides services to contacts. The contact center connects the contact with resources, such as agents. Communication is received from the contact, and the contact center generates a task offer associated with the contact. The task offer is broadcast to a set of resources. One or more of the resources accepts the task offer and one is connected to the contact.

BRIEF DESCRIPTION OF THE DRAWINGS

FIG. 4 is one embodiment of a list of resources;

DETAILED DESCRIPTION

The present embodiments relate to sizing contact center resources and/or the number of broadcast task offer messages based on a task acceptance factor. A task acceptance factor is the probability a resource will accept a task offer. The task offer is a request to perform a service for a contact.

In a first aspect, a system includes a first contact associated with a first task offer; one or more resources operable to accept the first task offer; and a contact center operable to determine a broadcast group of the one or more resources as a function of an acceptance factor for one or more of the resources.

In a second aspect, a method includes receiving a first contact in a contact center; determining a broadcast group as a function of an acceptance factor of one or more resources that support the contact center; and broadcasting a first task offer to the broadcast group.

In a third aspect, logic encoded in one or more tangible media for execution is provided. Logic encoded in one or more tangible media for execution is defined as the instructions that are executable by the processor and that are provided on the computer-readable storage media, memories, or a combination thereof. When executed, the logic is operable to receive a first contact, generate a first task offer for the first contact based on a task for the first contact, such that the first task offer is operable to be accepted, denied, or ignored by one or more resource that are operable to accept the task offer, and determine a minimum set of the one or more resources as a function of one or more acceptance factors of the one or more resources, such that the task offer will be accepted.

As one example, a financial consulting company may use a contact center to connect customers with financial advisors. "Contact" is used herein since the communications may be through a call (e.g., call center) or other media (e.g., e-mail or Internet). A customer may call or contact the contact center. As the calls are received, the contact center treats the calls and generates a task offer for each call. For example, the call may be connected to a financial advisor or, if there are no financial advisors available, the call may be placed in a queue. The contact center broadcasts the task offer to a minimum number of financial advisors.

Figure 1:
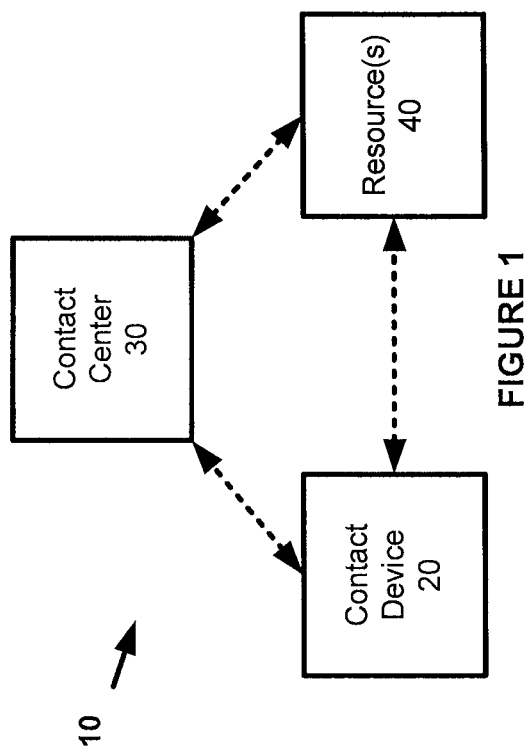
FIG. 1 is one embodiment of a contact center system.

FIG. 1 shows a enterprise system 10. The system 10 may include one or more contact devices 20, a contact center 30, and one or more resources 40. Additional, different, or fewer components may be provided. For example, the contact center 30 may operate independently of the contact devices 20 and resources 40. The system 10 may be used for sizing contact center systems, resources, and/or number of broadcast messages.

The system 10 may use a task acceptance factor to automatically determine the size of a contact center system, available resources, number of resources to be included in a broadcast, or number of broadcast messages. For example, the system 10 may provide automated assistance for determining the number of resources that satisfy a service level goal or for determining the number of resources in a broadcast group. The system 10 may automatically minimize contact center systems, the use of available resources, or broadcast groups based on one or more task acceptance factors. In another example, the enterprise system 10 includes an enterprise communications systems and enterprise resources, such as knowledge workers. The enterprise system 10 is operable to handle communication (e.g., calls, emails, SMS, IM, etc.) and work items and tasks (e.g., support cases and documents).

The contact device 20 may be a telephone, session initiation protocol (SIP) device, personal digital assistance (PDA), endpoint device, cellular device, wireless device, remote terminal device, LAN device, or any other communication device. The contact device 20 may be used to communicate with the contact center 30 or an enterprise communication system. A contact (e.g., a customer, potential customer, client, or any person desiring service from a contact center 30) may use the contact device 20. In the example above, the customer may use the contact device 20 to contact the financial consulting company's contact center about a financial inquiry.

The contact device 20 may communicate contact information to the contact center 30. The contact information may include inquiry information, operator information, account information, device information, system information, or any other information. In the example above, the customer may use the contact device 20 to communicate the customer's net worth, needed areas of financial expertise, customer's language of choice, customer's proficiency with finances, customer's familiarity with the laws related to finances, the type of network the customer is using, or any other information the contact center 30 may need, request, or use for any reason.

As will be discussed below, a resource 40 may communicate with the contact device 20. A resource 40 may be used to provide a service to a contact device 20. For example, the resource 40 may be an agent that is available to provide a service to the contact using the contact device 20. In the example above, the resources 40 are the financial advisors and/or associated hardware or software that are in a position to discuss financial matters with the customer.

Figure 2:
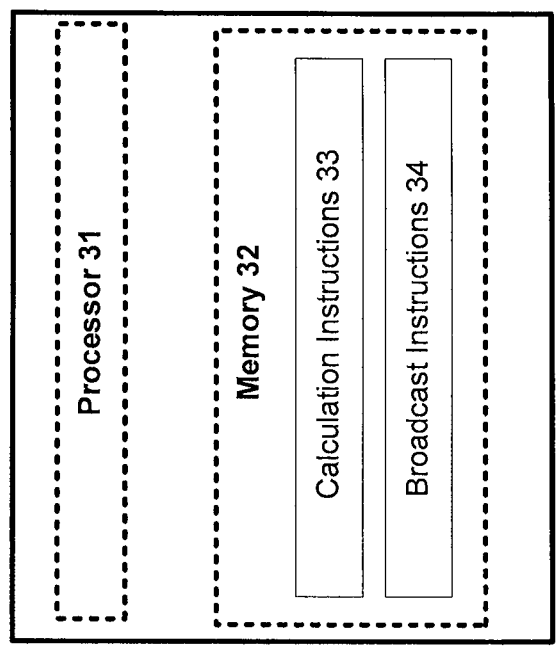
FIG. 2 is one embodiment of a contact center.

FIG. 2 shows a contact center 30. The contact center 30 may include a processor 31 and a memory 32. Additional, different, or fewer components may be provided. For example, the contact center 30 may include a display device, input device, or a port for communicating with other communication devices.

The contact center 30 is an enterprise communications system, call center, sizing calculator, resource calculator, personal computer, central server, call center server, broadcast system, central processing unit, or other device for sizing contact center systems, resources, or the number of broadcast messages. The contact center 30 provides automated assistance for connecting agents or other relevant resources with contacts. The contact center 30 may automatically receive communication from the contact device 20, generate a task offer associated with the communication, and determine a broadcast group based on an acceptance factor for the task offer. The contact center 30 broadcasts the task offer to the broadcast group.

The supporting resources 40 in the broadcast group may accept, ignore, or reject the task offer. If accepted, the supporting resource 40 is connected to the contact device 20 associated with the task offer. If all of the resources in the broadcast group reject the task offer or if the task offer times out, then the contact center 30 may repeat the determination of a broadcast group based on acceptance factors and issue another task offer to a retry broadcast group.

The contact center 30 may also determine a minimum set of resources that satisfy a service level goal. The minimum set of resources may be based on an acceptance factor.

The processor 31 is a general processor, digital signal processor, application specific integrated circuit, field programmable gate array, analog circuit, digital circuit, combinations thereof, or other now known or later developed processor. The processor 31 may be a single device or a combination of devices, such as associated with a network or distributed processing. Any of various processing strategies may be used, such as multi-processing, multi-tasking, parallel processing, remote processing, centralized processing or the like. The processor 31 is responsive to instructions stored as part of software, hardware, integrated circuits, firmware, micro-code or the like.

Figure 3:
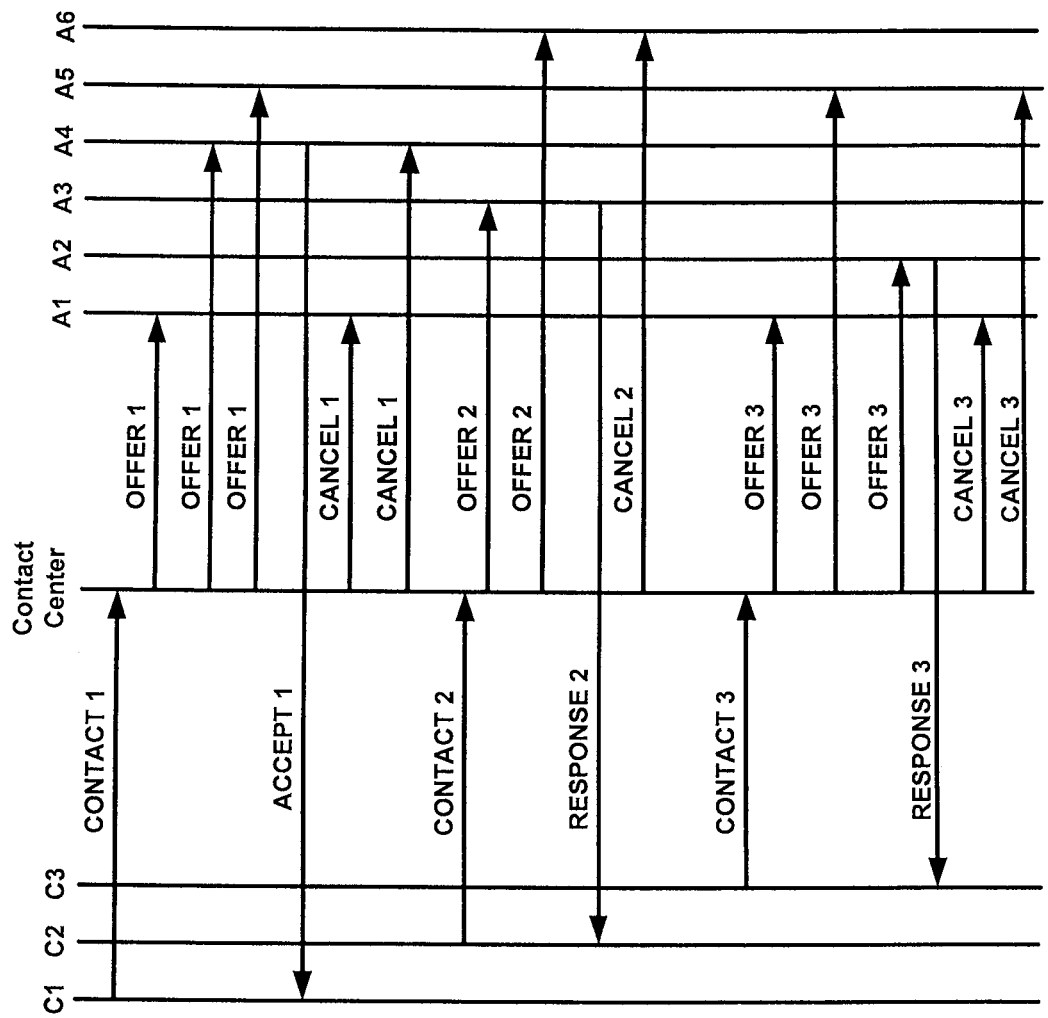
FIG. 3 is another embodiment of a contact center system.

The processor 31 may receive communication from a contact device 20. The communication may be a work item, telephone call, SIP call, electronic mail (email) message, facsimile message, or any other type of communication, synchronous or asynchronous. For example, as shown in FIG. 3, the contact center may receive a telephone call (CONTACT 1) from a contact device (C1).

The processor 31 may place the received communication in an assignment queue. The assignment queue may be a list of received contacts. The queue may be used to determine the next contact device 20 to receive service, such as being connected to a supporting resource 40. The list may be sequenced according to importance, time received, a combination thereof, or any other queuing strategy. For example, as shown in FIG. 3, CONTACT 1 may be received prior to CONTACT 2 and CONTACT 3. Accordingly, the contact device used to place CONTACT 1 may receive service prior to CONTACT 2 and CONTACT 3. In another example, later received CONTACT 3 may be classified as "important," and thus, may be serviced prior to earlier received CONTACT 2, which may be classified as "normal."

The processor 31 may generate a task offer. The task offer is a request for assistance or service. The task offer is associated with a contact device 20. Associating the task offer with the contact device 20 may include associating the task offer with contact device information, contact information, or any information related to the contact center. In the example above, the customer may have a question relating to mutual funds, and thus, the task offer may be associated with mutual funds.

The processor 31 may determine an acceptance factor for one or more resources 40. Since a resource may accept or reject a task offer, a resource's acceptance factor may be the probability that a resource 40 will accept or try to accept a task offer. For example, as shown in FIG. 4, an acceptance factor may range from 0 to 1, where 0 is 100% rejection and 1 is 100% acceptance. Each resource 40 may be associated with an acceptance factor. Other rankings may be used.

The acceptance factor may be an average or calculated acceptance factor, a contact-specific acceptance factor, system-specific acceptance factor, assignment queue acceptance factor, resource acceptance factor, a combination thereof, or any other acceptance factor. The acceptance factor may indicate the number of task offers accepted or likely to accept. For example, a resource 40 may receive 100 calls, but only handle 40. Accordingly, the acceptance factor may be (0.6). An agent's task acceptance factor is the calculated probability that the agent will accept the task offer for a specific contact based on any number of criteria.

An average acceptance factor is an average of one or more resource's acceptance factors. The average acceptance factor may be an average probability of a single supporting resource 40 over a period of time. The period of time may include the time period that the supporting resource 40 has been supporting the contact center 30, a week, a day, a year, a morning session, an afternoon session, or any other period of time. In the example of above, a financial advisor may have an acceptance factor of (0.3) for time period 1, an acceptance factor of (0.6) for time period 2, and an acceptance factor of (0.9) for time period 3. Accordingly, the average acceptance factor for the financial advisor may be (0.6).

The average acceptance factor may be an average for multiple supporting resources 40. The average acceptance factor may include a total average acceptance factor for a number of resources. If the number of resources changes, the average acceptance factor may change. In the example above, a first financial advisor may have an acceptance factor of (0.4), a second financial advisor may have an acceptance factor of (0.6), and a third financial advisor may have an acceptance factor of (0.8). Accordingly, the average acceptance factor may be (0.6).

The average acceptance factor may be based on an agent-specific factor. An agent-specific factor may be used to determine a resource's acceptance factor. An agent-specific factor may include the agent's mood, seniority, agent incentives, experience, or other factor relating to one or more resources likelihood of accepting a task offer message. In the example above, as the incentives for accepting a task offer message increase, the acceptance factor for accepting the task offer message may increase. In the example above, a financial advisor's compensation may increase for accepting and/or completing various task offers. The amount of compensation may increase or decrease the financial advisor's acceptance factor.

A contact-specific acceptance factor is an acceptance factor that is based on contact information. The probability that a supporting resource 40 will accept or reject a task offer may increase or decrease based on contact information. In the example above, if a financial advisor does not speak Spanish and a Spanish-speaking contact calls the contact center, then the probability that the financial advisor will accept the task offer may decrease.

A system-specific acceptance factor is an acceptance factor that is based on the system or resources. The probability that a supporting resource 40 will accept or reject a task offer may increase or decrease based on system or resource information. In the example above, a first financial advisor is more likely to accept a task offer if the first financial advisor is the only resource supporting the contact center (e.g., available).

The processor 31 may determine a broadcast group based on one or more acceptance factors. A broadcast group is a group of supporting resources 40 that receive a task offer. The broadcast group may be all, some, or none of the supporting resources 40. For example, as shown in FIG. 3, the resources (A1, A4, A5) that receive the task offer (OFFER 1) for CONTACT 1 may be a first broadcast group, and the resources 40 that receive the task offer (OFFER 2) for CONTACT 2 may be a second broadcast group.

The broadcast group may be the smallest number of resources 40 that satisfy a service level goal. The service level goal may be set to ensure or provide a sufficient probability that at least one resource in the broadcast group will accept the task offer. For example, as shown in FIG. 4, the smallest number of resources 40 that ensure a task offer is accepted is the broadcast group with resources A6 and A5, or the broadcast group with resources A6 and A4.

The broadcast group may be the smallest number of resources 40 with the greatest probability that the task offer will be accepted. For example, as shown in FIG. 4, the broadcast group with the smallest number of resources 40 and the greatest probability that the task offer will be accepted is the broadcast group with resources A5 and A6. In another example, the broadcast group is the minimum set of resources required to satisfy a service level goal or predetermined PKI (Performance Key Indicator)

The broadcast group may be the smallest number of resources 40 that ensures a resource in the broadcast group will accept the task offer and provides the greatest probability that a resource will be available to accept a task offer message. For example, the broadcast group of resources A1, A2, A3, and A4 ensures a resource in the broadcast group will accept the task offer and provides the greatest probability that a future task offer will be accepted.

One benefit of determining a minimum broadcast group based on the acceptance factor is that a second task offer may be handled without waiting for a first task offer to be accepted. Since the broadcast group may be less than all of the resources supporting the contact center, the resources that are not in the broadcast group are available to receive the second task offer. For example, the contact center may transmit the first task offer (OFFER 1) to a first broadcast group and the second task offer (OFFER 2) to a second broadcast group. The second task offer (OFFER 2) may be broadcast after the first task offer (OFFER 1) is broadcast and/or before the first task offer (OFFER 1) is accepted. Accordingly, the contact device 20 associated with the second task offer (OFFER 2) does not have to wait until the first task offer (OFFER 1) is accepted. The wait time to be serviced may be reduced.

The processor 31 may broadcast a task offer to a broadcast group. Broadcasting the task offer may include transmitting, disseminating, forwarding, publishing, or communicating a task offer message. For example, as shown in FIG. 3, CONTACT 1 may be forwarded to the first broadcast group. In another example, the task offer message may be transmitted in a text-based message (e.g., with a link to information relative to CONTACT 1) to the first broadcast group. The text-based message may be, for example, an instant message, email message, or a URL link to a data store with information about the contact useful to the resource in making their decision to accept or reject the task offer.

The processor 31 may update the broadcast groups based on one or more acceptance factors. The broadcast groups may be updated continuously or as a rule. For example, the broadcast groups may be updated when a task offer is generated, broadcasted, accepted and/or rejected. Accordingly, a resource 40 may be placed in one or more broadcast groups.

For example, as shown in FIG. 3, after OFFER 1 is accepted by resource (A4), the other resources (A1 and A5) in the first broadcast group may be placed in a third broadcast group that receives the third task offer (OFFER 3), along with resource (A2).

Figure 7:
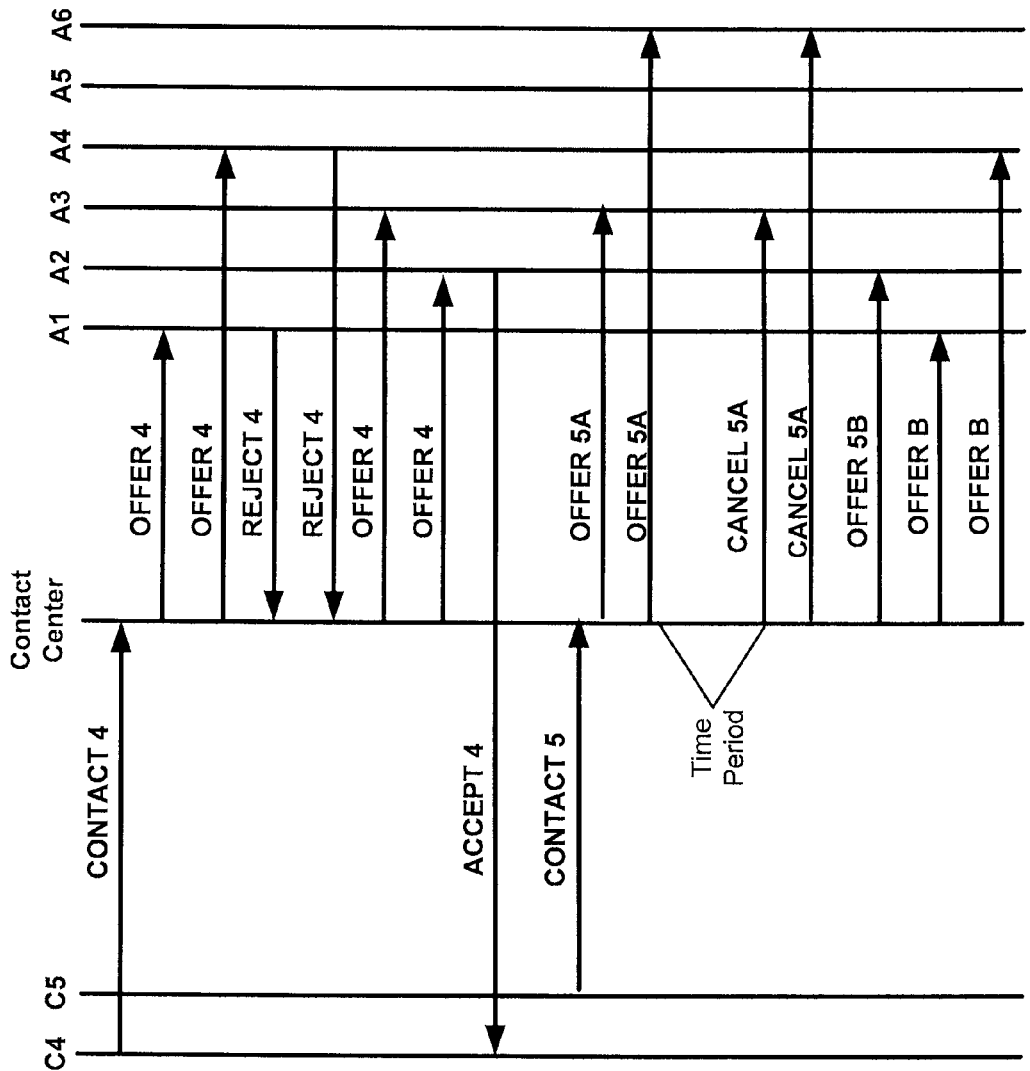
FIG. 7 shows another embodiment of a contact center system.

The processor 31 may determine a retry broadcast group. A retry broadcast group may be determined when the task offer message is not accepted, the task offer message is rejected by the resources in the original broadcast group, the task offer is ignored, the task offer message times out, or a combination thereof. For example, as shown in FIG. 7, if for any reason the resources in the original broadcast group (A1, A4) do not accept the original task offer (OFFER 4), such as rejecting the task offer (REJECT 4), the processor 31 may determine a retry broadcast group (A2, A3) based on an acceptance factor. In another example, as shown in FIG. 7, a retry broadcast group (A1, A2, A3) may be determined when the original task offer message (OFFER 5) times out.

The processor 31 may use a configurable timer to measure a time period. The processor 31 may start the timer, for example, when a task offer is broadcast to a broadcast group. After a predetermined period of time has expired, the contact center may perform an action. For example, the processor 31 may transmit a cancel message, determine a retry broadcast group, re-broadcast the original task offer to the original broadcast group, broadcast a retry task offer to a retry broadcast group, a combination thereof, or any other action. For example, as shown in FIG. 7, after the original offer (OFFER 5A) is not accepted for a period of time (Time Period), the original broadcast group (A3, A6) is cancelled (CANCEL 5A) and a retry broadcast group may be determined (A1, A2, A4). A retry task offer (OFFER 5B) may be transmitted to the retry broadcast group. As discussed below, a cancel message (CANCEL 5A) may be transmitted to the original broadcast group.

The time period measured by the timer may be configurable based on the acceptance factor, a resource average accept time, or other criteria. The time period may be set to minimize the time between an original task offer and a retry task offer, while providing sufficient time to accept the original task offer.

The processor 31 may continue to determine retry broadcast groups or continue to broadcast the original task offer to the original broadcast group until the task offer is accepted.

The processor 31 may transmit a cancel message to one or more resources in a broadcast group. The cancel message may be transmitted to the resources in the broadcast group that did not accept the task offer, or if the task offer timed out for that resource. The cancel message indicates that the task offer is no longer available to be accepted, for example, another resource accepted the task offer message. For example, as shown in FIG. 3, the contact center may transmit a cancel message (CANCEL 1) to resources A1 and A5, since resource A4 accepted (ACCEPT 1) the task offer (OFFER 1).

The sequential order of actions (i.e. receiving a contact, determining a task offer, determining a broadcast group, offering a task offer message, accepting a task offer message, cancelling a task offer, or any other act described herein) for different contacts is not limited. For example, as shown in FIG. 2, CONTACT 2 may be received prior to ACCEPT 1. In another example, ACCEPT 2 may be received prior to ACCEPT 1.

Referring back to FIG. 1, the processor 31 may be used to calculate a minimum set of resources 40 needed to support the contact center 30 based on one or more acceptance factors. The minimum set of resources 40 may be the minimum number of resources 40 that satisfy a service level goal based on one or more acceptance factors. The minimum set of resources 40 may be used by a system administrator when forecasting the needs of the contact center system 10.

Calculating a minimum set of resources 40 that satisfy a service level goal may include calculating traffic intensity and calculating a wait probability. The wait probability is the probability that a call will be answered in less than a target wait time using a defined number of resources. The processor 31 may compare the wait probability to a service level goal. The service level goal is the probability that a contact will be served in a desired time period. For example, if the target service time is 15 seconds, the service level goal is the probability that the contact will be served in 15 seconds. If the wait probability is equal to or greater than the service level goal, then the processor 31 may determine the minimum set of resources 40 needed to support the contact center 30 by dividing the defined number of resources by the average probability of the defined number resources. Other wait probabilities and/or goals may be used.

The processor 31 may communicate with the memory 32. Communicating with the memory 22 may include reading or writing. For example, the processor 21 may retrieve or store contact information, acceptance factor information, resource information, or service level information in the memory 32. In another example, the processor 31 may retrieve and execute instructions stored in the memory 32.

The memory 32 may be computer readable storage media, disk storage, memory store, or other device for storing information or data. The memory 32 may include various types of volatile and non-volatile storage media, including but not limited to random access memory, read-only memory, programmable read-only memory, electrically programmable read-only memory, electrically erasable read-only memory, flash memory, magnetic tape or disk, optical media and the like. The memory 32 may be a single device or a combination of devices. The memory devices 32 may be adjacent to, part of, networked with and/or remote from the processors 31.

The memory 32 may be computer readable storage media having stored therein data representing instructions executable by the programmed processor 31. The instructions may be for calculating or broadcasting. The memory device 32 stores instructions for the processor 31. The processor 31 is programmed with and executes the instructions. The functions, acts, methods or tasks illustrated in the figures or described herein are performed by the programmed processors 31 executing the instructions stored in the memory device 32. The functions, acts, methods or tasks are independent of the particular type of instructions set, storage media, processor or processing strategy and may be performed by software, hardware, integrated circuits, firm ware, microcode and the like, operating alone or in combination. The instructions are for implementing the processes, techniques, methods, or acts described herein.

The memory 32 is operable to store information. The memory 32 may store contact information, resource information, acceptance factor information, or any combination thereof. Additional, different, or less information may be stored in the memory 32. Resource information may include information related to the resource's average acceptance factor, contact-specific acceptance factor, total acceptance factor, or other acceptance factor.

As shown in FIG. 2, the memory 32 may store calculation instructions 33 and broadcast instructions 34. Additional, different, or fewer instructions may be provided. For example, the memory 32 may include receiving instructions that may be executed to receive communications from a contact device 20 or a resource 40. In another example, the memory 32 may include connecting instructions that may be executed for connecting a resource 40 to a contact device 20.

The calculation instructions 33 may be executed to determine a minimum set of resources 40 that satisfy a service level goal, a broadcast group, or a combination thereof. Additional, different, or fewer calculations may be automatically made using the calculation instructions. The broadcast instructions 34 may be executed to broadcast a task offer to the broadcast group or set of resources.

The resources 40 may be devices that are operable to accept or reject a task offer, automated services, system services, or other resources related to servicing a contact. The resources 40 may be operated by seated agents, informal (or remote) agents, knowledge workers, or supporting agents. The resources 40 may accept or reject a task offer. For example, the resources 40 are enterprise resources. In another example, the resources are operable to handle work items and tasks such as support cases and documents. In the example above, a financial advisor may reject a task offer that is associated with mutual funds because the financial advisor has little experience with mutual funds. In other embodiments, the resources 40 are automated without direct agent control.

The resources 40 may be monitored to determine an acceptance factor for one or more of the resources 40. For example, the contact center 30 may monitor or determine a resource's acceptance rate for one or more periods of time. Monitoring the resources 40 may include monitoring how many times the resource accepts, rejects, does not answer, fails to receive, attempts to accept a task offer, or a combination thereof.

Once a task offer is accepted, the resources 40 that accepted the task offer may connect to the contact device 20. Connecting to the contact device may include establishing communication with the contact, which may include being connected to an already established communication connection, such as a telephone call, or establishing a new communication connection. The contact center 30 may connect the resources 40 with the contact device 20. In the example above, a financial advisor may be connected to the customer's telephone call and discuss his inquiry about mutual funds.

Figure 5:
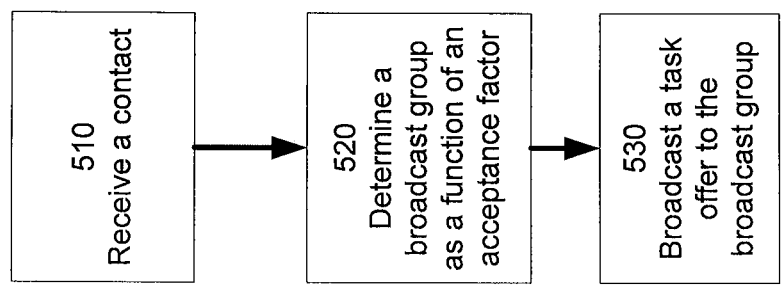
FIG. 5 shows a flow chart of a method for broadcasting a task offer.

FIG. 5 shows a flow chart of a method for broadcasting a task offer. The method is implemented using the system 100 of FIG. 1 or a different system. The acts may be performed in the order shown or a different order. The acts may be performed automatically, manually, or the combination thereof.

As shown in FIG. 5, the method may include receiving a new contact in a contact center (act 510), determining a broadcast group based on the acceptance factor (act 520), and broadcasting the task offer to the broadcast group (act 530). Additional, different, or fewer acts may be provided.

In act 510, a contact is received in the contact center. Receiving the contact may include receiving communication, contact information, requesting contact information, or determining information. For example, contact information may be received with the contact or communication. In another example, the contact center may request the contact information. An automated system may be used to request information. In another example, the contact center may determine contact information by retrieving contact information from memory, calculating contact information, or comparing contact information.

In act 520, a broadcast group is determined. The broadcast group is determined as a function of one or more acceptance factors. Determining the broadcast group may include determining an acceptance factor for one or more resources and/or determining a minimum set of resources to receive a task offer based on the acceptance factor. Additional, different or fewer acts may be provided. For example, additional broadcast groups may be determined.

An acceptance factor for one or more resources may be determined. Determining the acceptance factor may include accessing information stored in memory, calculating the acceptance factor, or a combination thereof. For example, an acceptance factor may be associated with one or more variables or factors stored in memory. The acceptance factor may change for different contacts, systems, or times. In the example above, a financial advisor's acceptance factor in the morning may be different than the financial advisor's acceptance factor in the evening.

In act 530, a task offer is broadcast to the broadcast group. Broadcasting the task offer to the broadcast group may include generating a task offer and transmitting the task offer to one or more resources. Additional, different or fewer acts may be provided. For example, additional task offers may be broadcast to additional broadcast groups.

Additional task offers may be broadcast to additional broadcast groups. Broadcasting additional task offers may include broadcasting the additional task offers after the original task offer was broadcast and/or before the original task offer was accepted. The additional task offer may be broadcast to resources not in the original broadcast group. In the example above, financial advisor's that do not receive a first task offer may be available to receive a second task offer while the financial advisor's that are receiving the first task offer are deciding whether to accept the first task offer. In other embodiments, one or more resources may receive multiple pending offers.

Figure 6:
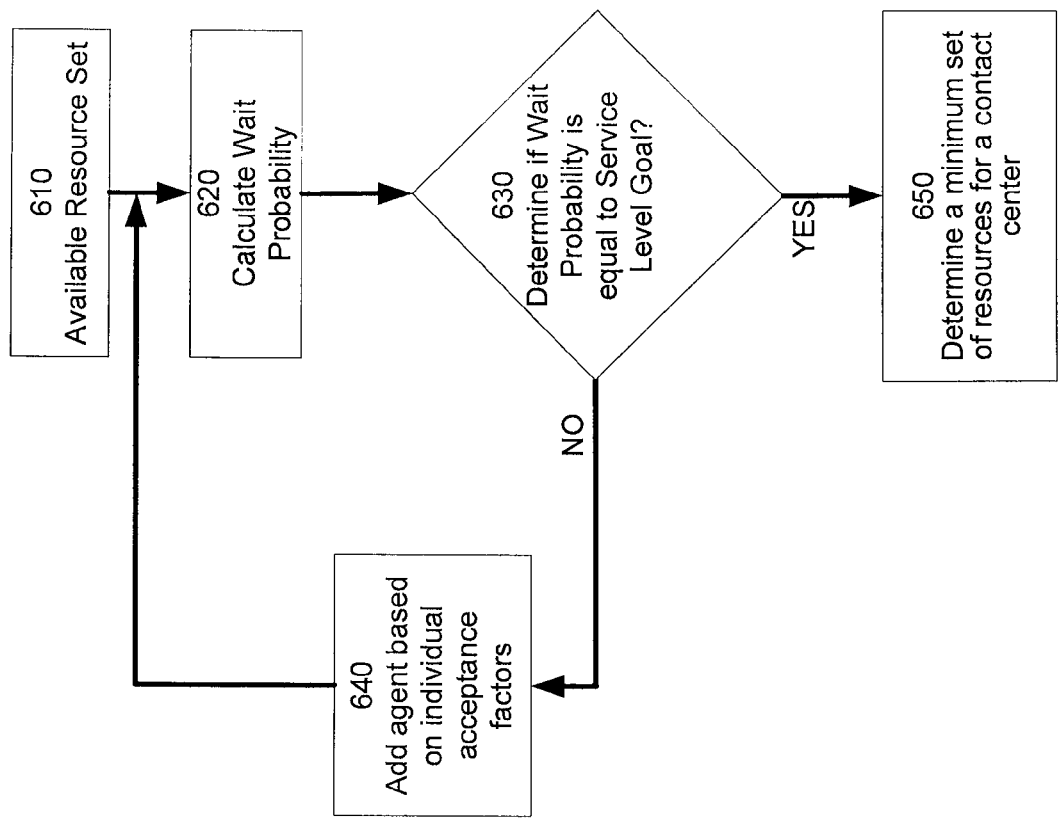
FIG. 6 shows a flow chart of a method for determining a minimum set of resources.

FIG. 6 shows a flow chart of a method for determining a minimum set of resources for a contact center. The minimum set of resources may be used to size a call center. The method is implemented using the contact center 30 of FIG. 1 or a different system. The acts may be performed in the order shown or a different order. The acts may be performed automatically, manually, or the combination thereof.

As shown in FIG. 6, the method may include setting the number of resources (610), calculating a wait probability (620), determining if the wait probability is equal to or less than a service level goal and resources are available (630), and determining a minimum set of resources as a function of an average acceptance factor (650). Additional, different, or fewer acts may be provided. For example, as shown in FIG. 6, the number of resources may be incremented until the wait probability is equal to or greater than a service level goal (640).

In act 610, the number of resources is set. Setting the number of resources may include defining variables, calculating traffic intensity, and setting the number of resources as a function of the traffic intensity. Additional, different, or fewer acts may be provided. For example, the number of resources may be set to an integer, such as zero (0), without defining a variable or calculating traffic intensity.

One or more variables may be defined. The variables may be any variable used to size a contact center. For example, the busy hour call attempts (BHCA) and average handle time (AHT) may be defined. The BHCA is the total number of calls during a peak traffic hour (or other interval) that are attempted or received in the contact center. The AHT is the mean (or average) contact duration during a specified time period. The AHT may be the sum of several types of handle time, such as call treatment time, talk time, and queuing time. For example, the AHT may include the sum of the agent's communication time and wrap-up time.

One benefit of defining one or more variables is that the system administrator may dynamically control the system, such that the system meets certain requirements. For example, the administrator may adjust variables that influence the desired service level goal. Accordingly, a minimum set of resources may be determined as a function of an average acceptance factor that satisfies the administrator's requirements.

The traffic intensity may be calculated. The traffic intensity may be the busy hour traffic (BHT) in Erlangs. BHT is the traffic load during the busy hour and is calculated as the product of the BHCA and the AHT normalized to one hour (e.g., 3600 seconds or 60 minutes). For example, the traffic intensity (u) may be calculated as shown in Equation 1.

$$u = \frac{BHCA * AHT}{3600} \quad \text{Equation 1}$$

The number of resources (m) may be determined as a function of the traffic intensity. The number of resources (m) may be set to the traffic intensity (u). Setting the number of resources (m) equal to the traffic intensity (u) assumes 100% agent (resource) utilization. Acts 620—640 may be used to obtain the optimum number of resources (m).

In act 620, a wait probability is calculated. The wait probability is the probability that a call will be answered in less than a target waiting time. For example, the probability that a call will be answered within x seconds, where x is a variable. Calculating a wait probability may include determining resource utilization, calculating a probability that a call will have to wait or be delayed, determining an average call delay time, and calculating a wait probability. Additional, different, or fewer acts may be provided.

The resource utilization may be determined. The resource utilization is the percentage of resources being used. The resource utilization may be determined as a function of the number of resources (m), the traffic intensity (u), the combination thereof, or any other variable. For example, the resource utilization (µ) may be calculated using Equation 2.

$$\mu = \frac{u}{m} \quad \text{Equation 2}$$

The probability that a contact (call) will have to wait (or be delayed) may be determined. The probability that a call will have to wait may be calculated with an Erlang-C formula. For example, the probability that a call will have to wait may be calculated using Equation 3.

$$P_C = \frac{\dfrac{u^m}{m!}\dfrac{m}{m-u}}{\displaystyle\sum_{k=0}^{k=m-1}\dfrac{u^k}{k!} + \dfrac{u^m}{m!}\dfrac{m}{m-u}} \quad \text{Equation 3}$$

The average call delay time may be determined. Determining the average call delay time may include reading the average call delay time from memory, receiving the average call delay time from a communication device, or calculating the average call delay time. The average call delay time may be calculated as a function of the probability that a call will have to wait ($P_c$), AHT, number of resources, resource utilization (μ), or any combination thereof. For example, average call delay time (ASA) may be calculated using Equation 4.

$$ASA = \frac{P_c * AHT}{m * (1 - \mu)} \quad \text{Equation 4}$$

The wait probability may be determined. Determining the average call delay time may include reading the wait probability from memory, receiving the wait probability from a communication device, or calculating the wait probability. The wait probability may be calculated as a function of the probability that a call will have to wait ($P_c$), CHT, traffic intensity (u), number of resources (m), target answer time (t), or any combination thereof. For example, wait probability $P_{(waittime<1)}$ may be calculated using Equation 5.

$$P_{(waittime<t)} = 1 - P_c * e^{-(m-u) * \frac{t}{CHT}} \quad \text{Equation 5}$$

In act 630, the wait probability is compared to a service level goal. A service level goal is the desired probability that a call will be answered in less than a target waiting time. The service level goal may be set by a system administrator. Comparison may include determining whether the wait probability is equal to or less than the service level goal and determining if there are resources available. If the wait probability is equal to or less than the service level goal, then a minimum set of seated resources may be determined as a function of an average acceptance factor (650). However, if the wait probability is not equal to or less than the service level goal, then the number of resources is increased and acts 620, 630, and 640 are repeated until the wait probability is equal to the service level goal. For example, an inequality comparison is performed. Also, checking whether there are any available agents who haven't been added is performed.

In act 640, a minimum set of resources is determined as a function of an average acceptance factor. Determination of the minimum set of resources may include determining an acceptance factor and calculating the minimum set of resources as a function of the acceptance factor. Additional, different, or fewer acts may be provided.

Determining an acceptance factor may include averaging the acceptance factor for the number of resources to determine an average acceptance factor ($\rho_a$). For example, a resource may be monitored to determine the number of offers accepted or rejected by the resource. The resource's acceptance factor may be determined by comparing the total number of offers and the number of offers accepted. The resource's acceptance factor may be averaged with the acceptance factors of the other resources in the number of resources (m). Alternatively, the actual acceptance factor for different resources may be used.

The minimum set of resources may be calculated. The minimum set of resources may be calculated as a function of the average acceptance factor ($\rho_a$), the number of resources (m), any other variables, or a combination thereof. For example, the minimum set of resources (m') may be calculated using Equation 6.

$$m' = \frac{m}{\rho_a} \quad \text{Equation 6}$$

In one example, the number of resources (m) needed to satisfy a service level goal is 10 (resources). However, since the average acceptance factor ($\rho_a$) for the 10 resources is 0.5, the minimum set of resources required to support the contact center is 200 (resources).

One benefit of determining a minimum set of resources as a function of an average acceptance factor is that it provides a more realistic outlook on the needs of the contact center. Since each resource may accept or reject a task offer, it is more accurate to factor in the resource's acceptance factor when determining how many resources are needed to adequately support the contact center. In the example above, the contact center administrator may be able to determine how many financial advisors need to be hired, based on an acceptance factor.

One benefit broadcasting a task offer to only a broadcast group is that it reduces the wait time for contacts. Since resources that are not in the broadcast group are preserved for future task offers, the contact center may broadcast a second task offer before a first task offer is received or broadcast. This increased the service time and customer satisfaction.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. Logic encoded in one or more non-transitory tangible media for execution and when executed operable to:
   receive a first customer service request,
   generate a task offer for the first customer service request automatically based on a task for the first customer service request, such that the task offer is operable to be accepted, denied, or ignored by one or more agents,
   calculate one or more acceptance factors for the one or more agents based on traffic intensity; and
   determine a minimum set of the one or more agents as a function of the one or more acceptance factors of the one or more agents, wherein the one or more acceptance factors indicate one or more probabilities that the task offer will be accepted or attempted to be accepted by the one or more agents,
   wherein the one or more acceptance factors is a plurality of acceptance factors (p), and a minimum set of one or more resources (m) support a contact center to achieve a service level goal (m') according to an equation m'=m/p.

2. The non-transitory tangible media of claim 1, when executed also operable to determine a minimum set of agents that support a contact center that received a first customer service contact as a function of the one or more acceptance factors of the one or more agents.

3. The non-transitory tangible media of claim 1, when executed also operable to populate a set with the one or more agents associated with a contact center to satisfy a service level goal.

4. The method of claim 1, further comprising:
   determining at the processor, a broadcast group of the minimum set of the one or more agents; and
   broadcasting a task offer to the broadcast group.

5. Logic encoded in one or more non-transitory tangible media for execution and when executed operable to:
   receive a first customer service request;
   generate a first task offer for the first customer service request;

calculate one or more acceptance factors for one or more agents based on traffic intensity; and determine a minimum set of the one or more agents as a function of the one or more acceptance factors of the one or more agents, wherein the one or more acceptance factors indicate one or more probabilities that the first task offer will be accepted or attempted to be accepted by the one or more agents.

6. The system of claim 5, wherein the logic when executed by the processor is further operable to calculate one or more acceptance factors based on contact information.

7. The system of claim 5, wherein the logic when executed by the processor is further operable to calculate one or more acceptance factors based on a quantity of the one or more agents.

8. The system of claim 5, wherein the logic when executed by the processor is further operable to determine a broadcast group as a function of the one or more acceptance factors.

9. The system of claim 8, wherein the logic when executed by the processor is further operable to broadcast the first task offer to the broadcast group.

10. The system of claim 8, wherein the logic when executed by the processor is further operable to broadcast the first task offer to a minimum set of the one or more agents to ensure that the first task offer is accepted.

11. The system of claim 5, wherein the logic when executed by the processor is further operable to determine a broadcast group and a minimum set of the one or more agents required to satisfy a service level goal.

12. The system of claim 8, wherein the broadcast group is a first broadcast group, and the logic when executed by the processor is further operable to:

receive a second customer service request;

generate a second task offer for the second customer service request;

determine a second broadcast group as a function of the one or more acceptance factors of the one or more agents not in the first broadcast group; and broadcast the second task offer to the second broadcast group.

13. The system of claim 12, wherein the logic when executed by the processor is further operable to broadcast the second task offer after the first task offer was broadcasted and before the first task offer was accepted by an agent included in the first broadcast group.

14. A computer-implemented method, comprising:

receiving at a processor, a first customer service request, generating at the processor, a first task offer for the first customer service request based on a task for the first customer service request;

calculating at the processor, one or more acceptance factors for the one or more agents based on traffic intensity; and determining at the processor, a minimum set of the one or more agents as a function of the one or more acceptance factors, wherein the one or more acceptance factors is a plurality of acceptance factors (p), and wherein a minimum set of one or more resources (m) support a contact center to achieve a service level goal (m') according to the equation m'=m/p.

15. The method of claim 14, further comprising calculating one or more acceptance factors based on contact information.

16. The method of claim 14, further comprising calculating one or more acceptance factors based on a quantity of the one or more agents.

17. The method of claim 14, further comprising determining a broadcast group as a function of the one or more acceptance factors.

18. The method of claim 17, further comprising broadcasting the first task offer to the broadcast group.

19. The method of claim 17, further comprising broadcasting the first task offer to a minimum set of the one or more agents to ensure that the first task offer is accepted.

20. The method of claim 14, further comprising determining a broadcast group and a minimum set of the one or more agents required to satisfy a service level goal.

* * * * *